UNITED STATES PATENT OFFICE.

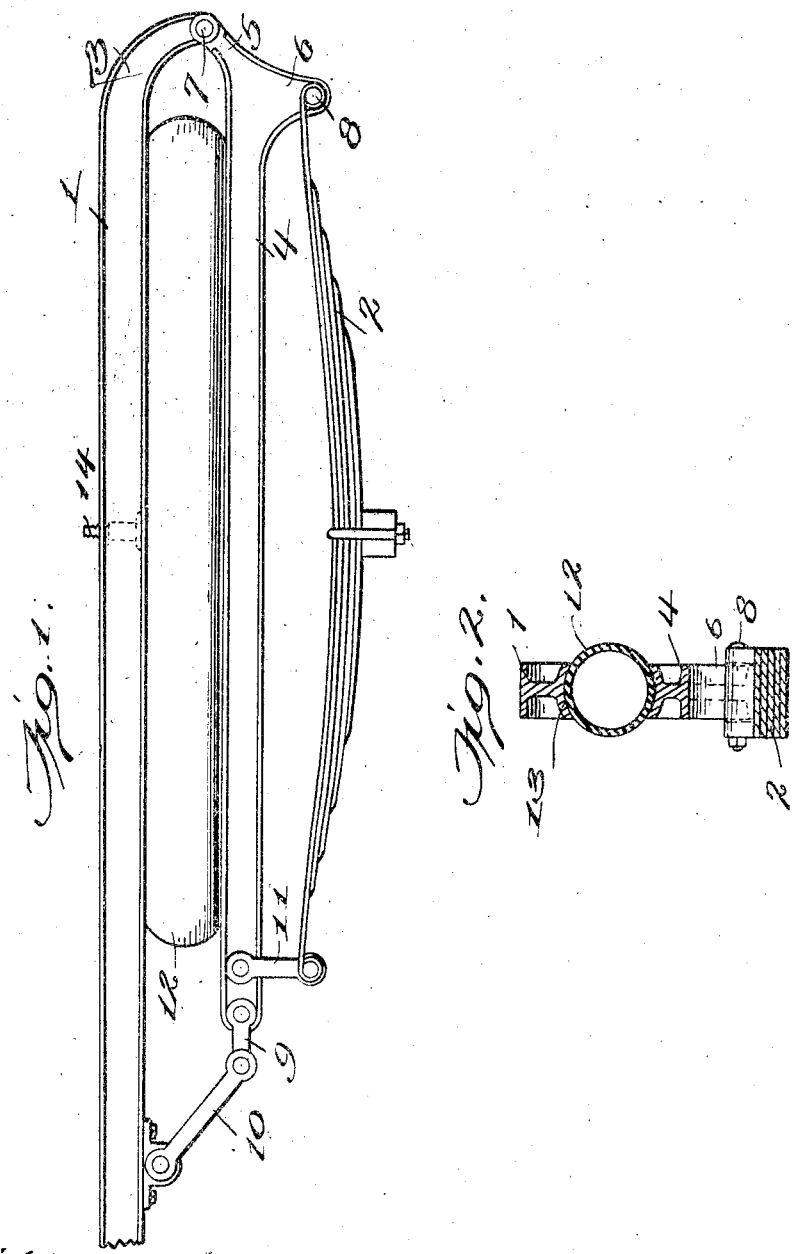

WALTER H. COOK, OF NEW ORLEANS, LOUISIANA.

SHOCK-ABSORBER.

1,058,410.  Specification of Letters Patent.   Patented Apr. 8, 1913.

Application filed May 28, 1912. Serial No. 700,268.

*To all whom it may concern:*

Be it known that I, WALTER H. COOK, a citizen of the United States, residing at New Orleans, parish of Orleans, State of Louisiana, have invented certain new and useful Improvements in Shock-Absorbers, of which the following is a specification.

This invention relates to improvements in shock absorbers for automobiles, and it proposes a construction for cushioning any sudden movements of the springs such as are developed when the machine is running over rough roads.

The objects of the invention are to provide a shock absorber which will have a uniform cushioning action, which does not entail any special construction of spring nor any connections to the springs, such as might interfere with the proper yielding action thereof or might produce a weakening effect; and which may be compactly and securely applied to a main frame of ordinary form.

An embodiment of the invention is illustrated in the accompanying drawings, wherein:

Figure 1 is a side elevation of a shock absorber in which the features of the invention are incorporated; and Fig. 2 is a detail cross sectional view showing the manner of associating the cushioning element with the yieldable bar upon which it rests.

Similar characters of reference designate corresponding parts throughout the several views.

The main frame 1 and the springs 2 may be of the usual construction. The drawing shows a side bar of the main frame, which, at its ends, is provided with the usual overhangs 3. One of these overhangs is shown in the drawings. Instead of attaching one end of the spring 2 directly to the overhang 3, as is usual, said overhang forms a means of support for a longitudinal bar 4, having at its forward end oppositely projecting ears 5 and 6, the ear 5 being pivoted to the overhang 3, as by a pin 7, and the ear 6 being pivoted to the spring 2, as by a pin 8. The bar 4 is arranged immediately under the side bar of the frame to which it is attached, and in its average position, is substantially parallel to said side bar. At its inner end, it is connected by links 9 and 10 to the adjacent side bar of the frame 1. The link 9 is pivoted to the bar 4, and the 10 is pivoted to the side bar of the frame 1. The mutually adjacent ends of the links 9 and 10 are pivoted to one another. The inner end of the spring 2 is pivoted to a link 11, which is in turn pivoted to the bar 4 and hangs therefrom. Between the bar 4 and the adjacent side bar of the frame 1, a pneumatic cushion 12 is interposed. The cushion 12, in the embodiment shown, consists of a heavy rubber tube which is nearly of the same length as the bar 4, and which is securely held between said bar and the adjacent side bar of the frame 1. The upper face of the bar 4 is widened and concave, as at 13, so as to form a secure seat for the cushion 12. The latter is provided with a valve 14 of usual form, through which it may be charged with compressed air. The bar 4 may be, and preferably is, of the same structural character as the side bars of the frame.

It will be apparent that the yielding movements of the spring are transmitted through the bar 4 to the cushion 12, and that said cushion will act to effectually resist any sudden or strong yielding movements of the spring, such as are developed when the machine is traveling over rough roads. The cushion 12 is nearly the same length as the bar 4, as already stated, and has practically the same length as the spring 2. Consequently, the cushioning action of the part 12 is transmitted uniformly to said spring and the easy running of the vehicle is promoted, while at the same time, wear and tear are correspondingly reduced.

The arrangement is very simple, compact, and strong, and does not require a main frame or a main spring of any special character.

Having fully described my invention, I claim:

1. In a shock absorber, the combination with a side bar of the main frame, and with a spring, of a longitudinal bar to receive the impulses of the spring and having its outer end directly pivoted to the adjacent end of said side bar, links pivotally connecting the inner end of said longitudinal bar and said side bar, and a longitudinally disposed cushioning element interposed between the longitudinal bar and the side bar.

2. In a shock absorber, the combination with a side bar of the main frame, and with a spring, of a longitudinal bar to receive the impulses of the spring and having its outer end directly pivoted to the adjacent end of said side bar, links pivotally connecting the inner end of said longitudinal bar and said side bar, and a longitudinally disposed cushioning element of practically the same length as the spring interposed between the longitudinal bar and the side bar.

3. In a shock absorber, the combination with a side bar of the main frame, of a longitudinal bar having its outer end directly pivoted to the adjacent end of said side bar, links pivotally connecting the inner end of said longitudinal bar and said side bar, a longitudinally disposed cushioning element interposed between the longitudinal bar and the side bar, a longitudinally disposed main spring arranged under said longitudinal bar and pivoted directly thereto at one end, and a link connection between the other end of said main spring and said longitudinal bar.

In testimony whereof I have hereunto set my hand in presence of two subscribing witnesses.

WALTER H. COOK.

Witnesses:
CHARLES H. NASH,
ROBERT WATERMAN.